United States Patent
Sakai

(10) Patent No.: US 6,943,354 B2
(45) Date of Patent: Sep. 13, 2005

(54) RADIATION DETECTOR

(75) Inventor: Shirou Sakai, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 197 days.

(21) Appl. No.: 10/343,233

(22) PCT Filed: Jul. 31, 2001

(86) PCT No.: PCT/JP01/06579
§ 371 (c)(1),
(2), (4) Date: Jan. 30, 2003

(87) PCT Pub. No.: WO02/10796
PCT Pub. Date: Feb. 7, 2002

(65) Prior Publication Data
US 2003/0146387 A1 Aug. 7, 2003

(30) Foreign Application Priority Data
Jul. 31, 2000 (JP) ........................ 2000-232023

(51) Int. Cl.⁷ ................................ G01T 1/20
(52) U.S. Cl. .................... 250/361 R; 250/368
(58) Field of Search ............... 250/361 R, 368

(56) References Cited

U.S. PATENT DOCUMENTS 3,068,359 A    12/1962  Carlson
4,543,485 A  *  9/1985  Ishii et al. ............... 250/487.1
4,931,645 A  *  6/1990  Welsh ..................... 250/361 R
6,278,118 B1    8/2001  Homme et al. ........ 250/370.11

FOREIGN PATENT DOCUMENTS

| EP | 0 903 590 A1 | 3/1999 | | |
| JP | S53-33595 | 8/1978 | | |
| JP | 54-034884 | 3/1979 | | |
| JP | S57-124271 | 8/1982 | | |
| JP | 60-262083 | 12/1985 | | |
| JP | 61-275681 | 12/1986 | | |
| JP | 62-059884 | 3/1987 | | |
| JP | 03-208249 | 9/1991 | | |
| JP | 6-222149 A | * | 8/1994 | ............ G01T/1/20 |
| JP | 10-282244 | 10/1998 | | |
| JP | 2000-19255 A | * | 1/2000 | ............ G01T/1/20 |
| WO | WO 98/36290 A1 | * | 8/1998 | ............ G01T/1/20 |
| WO | WO 99/38031 | 7/1999 | | |

* cited by examiner

Primary Examiner—Constantine Hannaher
(74) Attorney, Agent, or Firm—Drinker Biddle & Reath LLP

(57) ABSTRACT

Regarding to the radiation detector 10, which has the scintillator 16 placed on the light incidence plane plate member of the photomultiplier tube by use of the optical binder 14 interposed therebetween, and which includes a coated film FLM formed so as to cover the scintillator and at least part of the side tube portion 12b of the photomultiplier tube, since the scintillator and the photomultiplier tube are strongly fixed to each other by use of the coating film FLM, so that the size increase of the radiation detector can be suppressed.

11 Claims, 5 Drawing Sheets

RADIATION DETECTOR

TECHNICAL FIELD

The present invention relates to a radiation detector.

BACKGROUND ART

As a radiation detector of a combination of a photomultiplier tube and a scintillator, for example, a radiation detector as disclosed in Japanese Patent Laid-Open No. Shou62(1987)-59884 gazette has been known.

FIG. 5 is a view illustrating a radiation detector 1 described in the said gazette. The radiation detector 1 has a constitution, in which a metallic container 3 accommodating a scintillator 2 is fixed to a faceplate, a light incidence plane plate member 5a of a photomultiplier tube 5 with an optical binder 4 interposed therebetween. The optical binder 4 also functions as adhesive.

On one of end of the metallic container 3, which is placed on a side of the light incidence plane plate member 5a of the photomultiplier tube 5, a light emission window 6 made of glass is applied. Accordingly, when radiation is incident on the scintillator 2, light is generated. Then the light is incident on the light incidence plane plate member 5a via the light emission window 6 and the optical binder 4 into the photomultiplier tube 5, where the light is converted into electric signals, which are amplified by the photomultiplier section 5c and focused on an anode 5d.

DISCLOSURE OF THE INVENTION

However, the radiation detector according to the above described conventional art had a problem described below. Specifically, the radiation detector according to the above described conventional art tends to be large, since the scintillator accommodated in the metallic container is fixed to the photomultiplier tube. More specifically, if the diameter of the scintillator is to be adjusted to the diameter of the light incidence plane plate member of the photomultiplier tube, the diameter of the metallic container should be designed larger than that of the scintillator. Moreover, it may be possible that the diameter of the metallic container is matched to the diameter of the light incidence plane plate member of the photomultiplier tube. In this case, the diameter of the scintillator becomes smaller than that of the light incidence plane plate member, so that radiation detection efficiency declines.

In the above described radiation detector, it is requested in many cases that, after the metallic container accommodating the scintillator and the photomultiplier tube are fixed with the optical binder interposed therebetween, the metallic container accommodating the scintillator and the photomultiplier tube are strongly fixed by use of a metallic case or the like which covers the metallic container accommodating the scintillator and the photomultiplier tube. In such a case, the radiation detector further increases in size.

Therefore, an object of the present invention is to provide a radiation detector which solves the problem mentioned above, in which a scintillator and a photomultiplier tube can be strongly fixed, and which is small in size.

In order to solve the above described problem, the radiation detector according to the present invention, which has the scintillator placed on the light incidence plane plate member of the photomultiplier tube with the optical binder interposed therebetween, is characterized by including a coated film formed so as to cover the scintillator and at least part of the side tube portion of the photomultiplier tube.

Since the coated film is formed so as to cover the scintillator and at least part of the side tube portion of the photomultiplier tube, the scintillator and the photomultiplier tube can be strongly fixed to each other. Various structures of the coated films are possible. Since the scintillator and the photomultiplier tube are strongly fixed to each other by the coated film, the size increase of the radiation detector can be suppressed, and the radiation detector can be constituted in small size.

BEST MODES OF CARRYING OUT THE INVENTION

A description about a radiation detector according to a first embodiment of the present invention will be made with reference to the drawings. First, a constitution of the radiation detector of the embodiment will be described.

Figure 1:
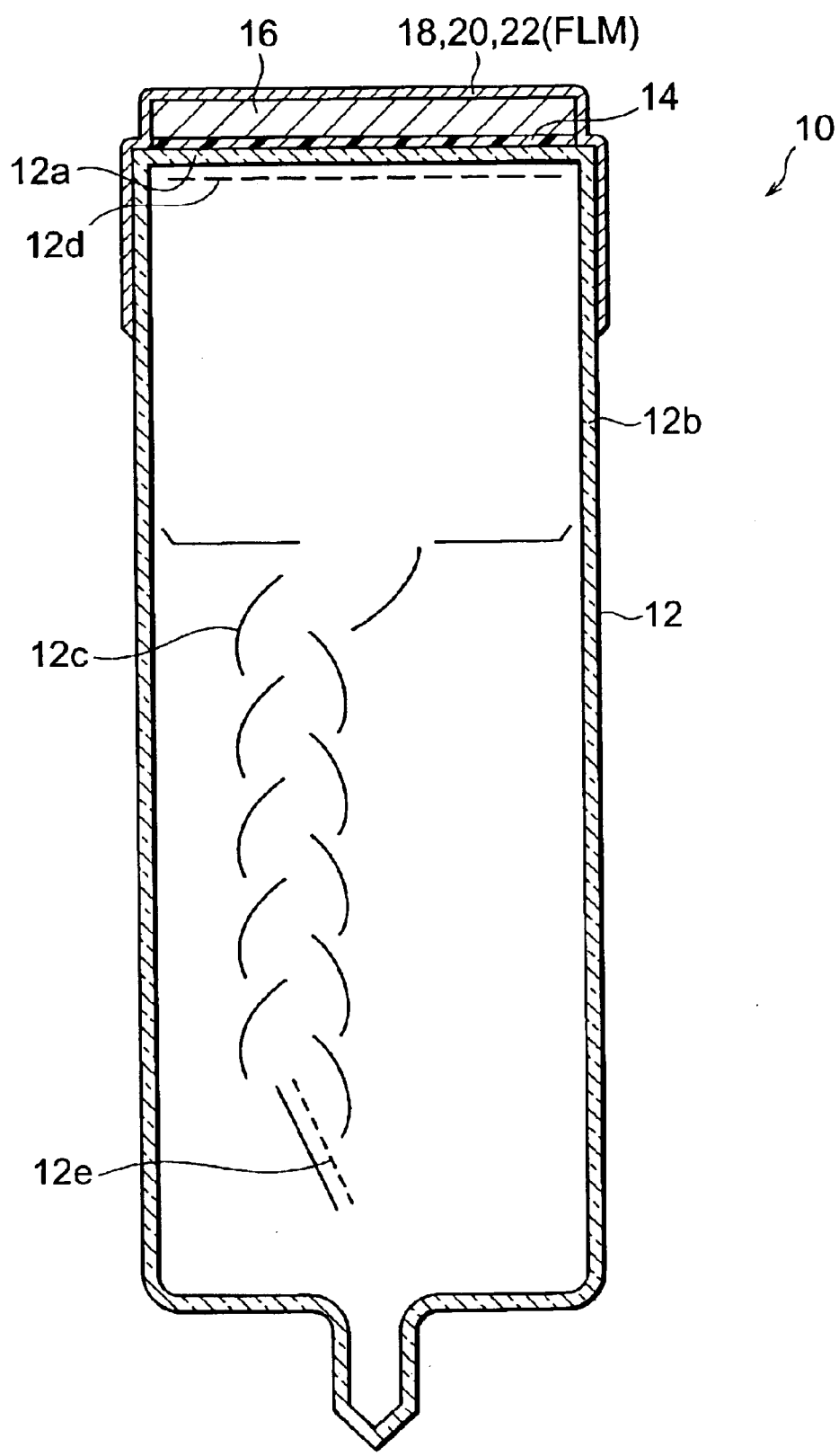
FIG. 1 is a sectional view of a radiation detector according to a first embodiment of the present invention.
Figure 2:
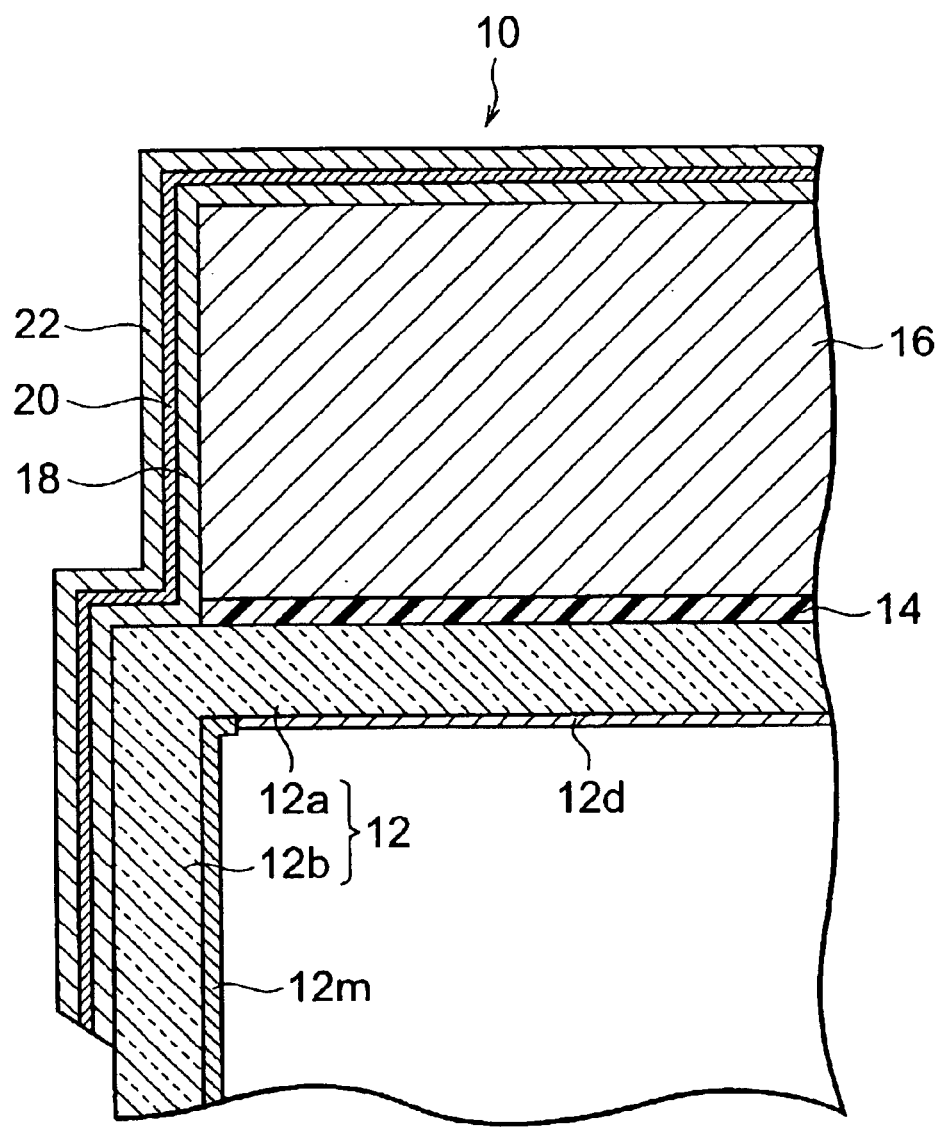
FIG. 2 is a partial enlarged sectional view of the radiation detector according to the first embodiment of the present invention.

FIG. 1 is a sectional view of the radiation detector according to the present invention. FIG. 2 is a partial enlarged sectional view of the radiation detector according to the embodiment.

As illustrated in FIGS. 1 and 2, the radiation detector 10 according to this embodiment includes a photomultiplier tube 12, a scintillator 16 placed on a light incidence plane plate member 12a of the photomultiplier tube 12 with an optical binder 14 interposed therebetween, a first layer film (first organic film in this example) 18 formed so as to cover the scintillator 16 and at least part of a side tube portion 12b, a first intermediate layer film (metallic film in this example) 20 formed on the outside of the first layer film 18, and a second layer film (second organic film in this example) 22 formed on the outside of the intermediate layer film 20. In FIG. 1, for the sake of convenience, the first layer film 18, the first intermediate layer film 20, and the second layer film 22 are illustrated as a single layer film FLM. Each component will be described in detail below.

As shown in FIG. 1, the photomultiplier tube 12 has a structure, in which a photomultiplier section 12c is incorporated in an airtight container including the light incidence plane plate member 12a and the side tube portion 12b. On an inner surface of the light incidence plane plate member 12a, a bialkali photoelectric surface 12d using alkali metal such as Na, K, Rb, and Cs is formed. Note that the photoelectric surface 12d may use Sb and alkali metal or the like. A predetermined electric potential is given on the photoelectric surface 12d via a focusing electrode 12m made of Al vapor-deposited on an inner surface of the side tube portion 12b. The photoelectric surface 12d outputs photoelectrons along with an amount of incident light on the light incidence plane plate member 12a. The photoelectrons outputted from the photoelectric surface 12d are amplified by the photomultiplier section 12c and gathered by an anode 12e located at the end of the photomultiplier section 12c.

On an outer surface of the light incidence plane plate member 12a of the photomultiplier tube 12, the scintillator 16 is arranged by use of the optical binder 14 interposed therebetween.

The optical binder 14 fills a gap between the light incidence plane plate member 12a of the photomultiplier tube 12 and the scintillator 16, and eases change in refractive index given by the light which is incident on the light incidence plane plate member 12a of the photomultiplier tube 12 from the scintillator 16.

The optical binder 14 also has a function of adhesion of the light incidence plane plate member 12a of the photomultiplier tube 12 with the scintillator 16, although the function is insufficient. As the optical binder 14, silicone oil (for example, Toray Dow Corning SH200 (refractive index: 1.375–1.404), Shinetsu silicone oil KF96 (refractive index: 1.374–1.404)), silicone oil compound (for example, optseal (refractive index: 1.469), silicone gel (for example, Toray Dow Corning SE188), silicone rubber (for example, Toray Dow Corning JCR6122, Shinetsu Corning KE420/KE1800, GE silicone RTV656), and the like can be listed.

The scintillator 16 is composed of NaI(Tl), CsI(Na), CsI(Tl), or the like. Particularly, the scintillator 16 is formed depending on a portion (effective light receiving surface) where the photoelectric surface 12d is formed.

The first layer film 18 is made of poly-para-xylylene. As shown in FIG. 2, the first layer film 18 is formed in close contact with the scintillator 16 and the side tube portion 12b of the photomultiplier tube 12 so as to cover the scintillator 16 and approximately one fifth of the upper portion of the side tube portion 12b of the photomultiplier tube 12 (on a side of the light incidence surface plate member 12a).

On the outside of the first layer film 18, the first intermediate layer film 20 is formed. The first intermediate layer film 20 is made of aluminum and formed in close contact with the first layer film 18 so as to cover the first layer film 18. The first intermediate layer film 20 also functions as a reflecting film for light generated by the scintillator 16.

On the outside of the first intermediate layer film 20, the second layer film 22 is formed. The second layer film 22 is made of poly-para-xylylene and formed in close contact with the first intermediate layer film 20 so as to cover the first intermediate layer film 20. The second layer film 22 also has a function to prevent peel-off of the first intermediate film 20.

Next, a description will be made on a method of manufacturing the radiation detector according to this embodiment. In order to manufacture the radiation detector 10 according to this embodiment, first, the surface of the side tube portion 12b of the photomultiplier tube 12 is roughened by sandblast. The roughening of the surface of the side tube portion 12b is for making the close contact easier between the first layer film 18 and the surface of the side tube portion 12b of the photomultiplier tube 12.

Subsequently, the scintillator 16 is arranged on the light incidence plane plate member 12a of the photomultiplier tube 12 by use of the optical binder 14 interposed therebetween. Here, if a material having also an adhesive function is selected as the optical binder 14, (for example, silicone rubber), the light incidence plane plate member 12a of the photomultiplier tube 12 and the scintillator 16 are easily fixed.

Subsequently, poly-para-xylylene layer is prepared by vapor deposition on the whole of the scintillator 16 and the side tube portion 12b of the photomultiplier tube 12 to form the first layer film 18. Then, aluminum is vapor-deposited on the first layer film 18 to form the first intermediate layer film 20. After the preparation of the first intermediate layer film 20, poly-para-xylylene layer is again prepared by vapor deposition on the first intermediate layer film 20 to form the second layer film 22. Finally, the first layer film 18, the first intermediate layer film 20, and the second layer film 22 formed on an unnecessary portion (for example, on a lower part of the side tube portion 12b of the photomultiplier tube 12) are cut off and removed, thus the radiation detector 10 is completed.

Next, a description will be made referring a function and an effect of the radiation detector according to this embodiment. In the radiation detector 10 according to this embodiment, the scintillator 16 is placed on the light incidence plane plate member 12 of the photomultiplier tube 12 with the optical binder 14 interposed therebetween, and the first layer film 18 is formed so as to cover the scintillator 16 and part of the side tube portion 12b of the photomultiplier tube 12. Accordingly, the scintillator 16 and the photomultiplier tube 12 can be fixed by the first layer film 18.

Moreover, regarding the radiation detector 10 according to this embodiment, the first intermediate layer film 20 is additionally formed on the outside of the above described first layer film 18, and the second layer film 22 is further formed on the outside of the first intermediate layer film 20. Accordingly, the scintillator 16 and the photomultiplier tube 12 can be strongly fixed by the first intermediate layer film 20 and the second layer film 22.

In terms of the radiation detector 10 according to this embodiment, the scintillator 16 and the photomultiplier tube 12 are fixed by a film such as the first layer film 18, the first intermediate layer film 20, and the second layer film 22. Accordingly, the radiation detector 10 can be constituted so as not to increase in external size very much. In other words, the radiation detector 10 can be constituted in small size.

In terms of the radiation detector 10 according to this embodiment, since the scintillator 16 and the photomultiplier tube 12 are fixed by a film such as the first layer film 18, the first intermediate layer film 20, and the second layer film 22, the shape of the scintillator 16 is designed comparatively freely, compared with the conventional radiation detector in which the metallic container accommodating the scintillator is fixed onto the photomultiplier tube. Moreover, the radiation detector 10 is sensitive to low energy radiation and the radiation detector 10 can be manufactured in low cost.

The radiation detector 10 according to this embodiment, since the first layer film 18 and the second layer film 22 are formed using poly-para-xylylene which is excellent in dampproof property, effectively prevents deliquesce of the scintillator 16.

Figure 3:
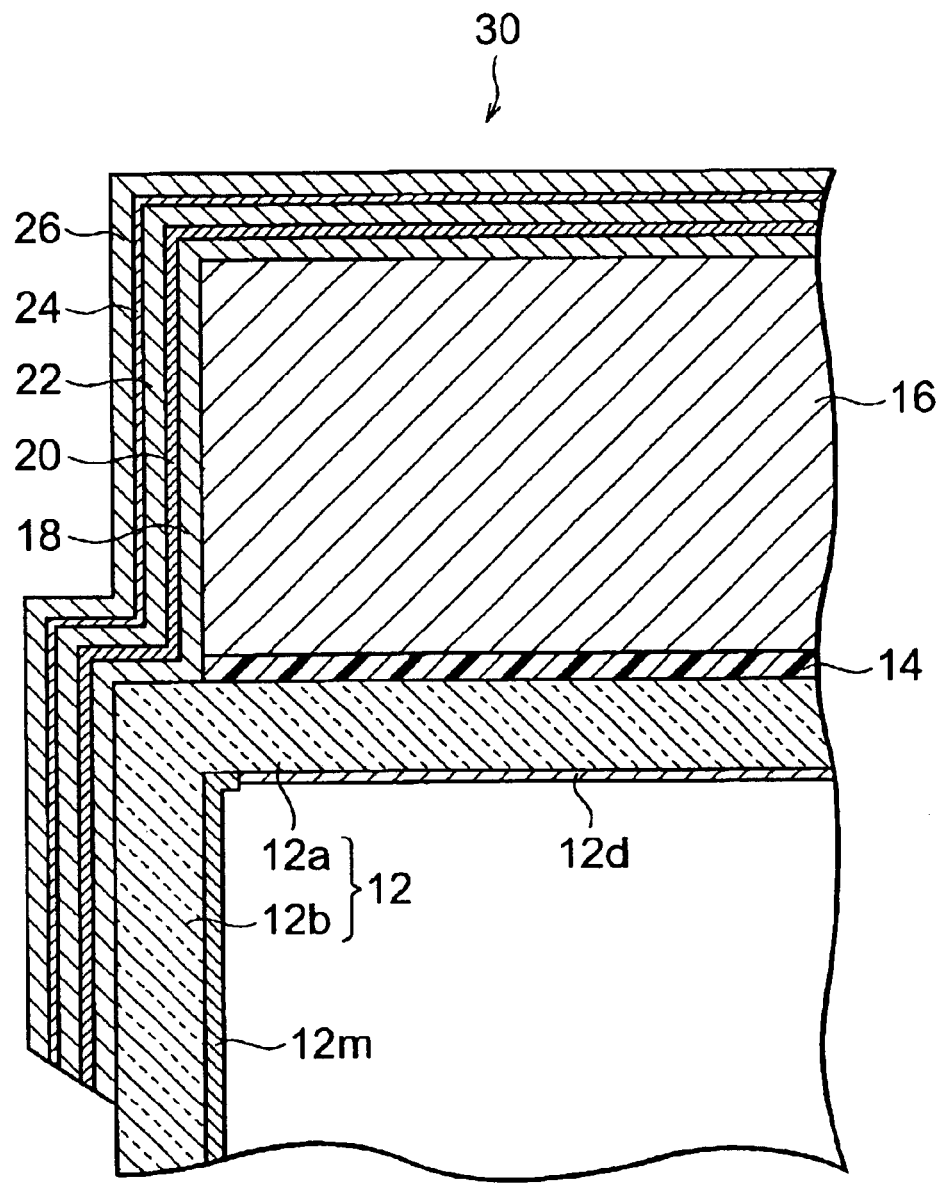
FIG. 3 is a partial enlarged sectional view of a radiation detector according to a second embodiment of the present invention.

Next, a description will be made of a radiation detector according to a second embodiment of the present invention with reference to the drawings. FIG. 3 is a partial enlarged sectional view of the radiation detector according to this embodiment. The structural difference between a radiation detector 30 according to this embodiment and the radiation detector 10 according to the first embodiment is that the radiation detector 30 according to this embodiment includes a second intermediate layer film (transparent inorganic film) 24 formed on the outside of the second layer film 22 and a third layer film (third organic film) 26 formed on the outside of the second intermediate layer film 24.

The intermediate layer film 24 is made of $SiO_2$ and formed in close contact with the second layer film 22 so as to cover the second layer film 22. The third layer film 26 is made of poly-para-xylylene and formed in close contact with the second intermediate layer film 24 so as to cover the second intermediate layer film 24. In this embodiment, the second intermediate layer film 24 is prepared by depositing $SiO_2$ on the second film 22 by vapor deposition. The third layer film 26 is formed by vapor deposition of poly-para-xylylene on the second intermediate layer film 24.

The formation of the second intermediate layer film layer 24 and the third layer film 26 can make the scintillator 16 and the photomultiplier 12 fix furthermore strongly to each other.

In the radiation detector 30 according to this embodiment, on the scintillator 16 and part of the tube side portion 12b of the photomultiplier tube 12, the first layer film 18, the first intermediate layer film 20, the second layer film 22, the second intermediate layer film 24, and the third layer film 26 are formed in this order. Instead, these layer films may be formed in the order of the first layer film 18, the second intermediate layer film 24, the third layer film 26, the first intermediate layer film 20, and the second layer film 22.

In the radiation detectors 10 and 30 according to the above embodiments, a lamination made of the first layer film 18, the first intermediate layer film 20, and the second layer film 22, and a lamination made of the first layer film 18, the first intermediate layer film 20, the second layer film 22, the second intermediate layer film 24, and the third layer film 26 are respectively formed so as to cover about a fifth of the upper part of the side tube portion 12b of the photomultiplier tube 12. However, the part where the films are formed is not limited to approximately a fifth of the upper part. These films may be formed so as to cover about the upper half of the side tube portion 12b of the photomultiplier tube 12 or so as to cover the whole of the side tube portion 12b of the photomultiplier tube 12.

Figure 4A:
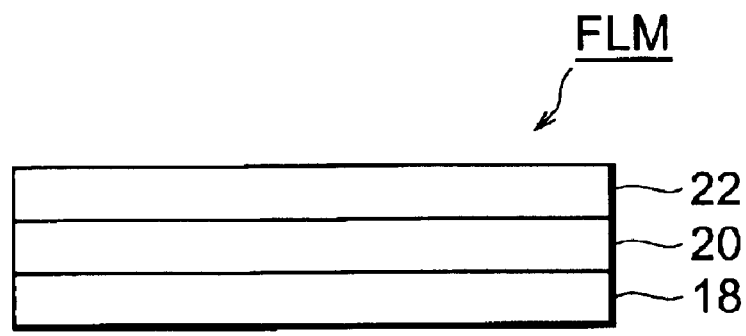
FIGS. 4A, 4B, and 4C are views showing multi-layer structures of a coated film FLM.

FIG. 4A is a diagram illustrating a multi-layer structure of the coated film FLM having a three layer structure shown in FIG. 1. From the scintillator 16 side, the first layer film 18, the first intermediate layer film 20, and the second layer film 22 are sequentially laminated.

In the first embodiment, the first layer film 18 is an organic film, the first intermediate layer film 20 is a metallic film, and the second layer film 22 is an organic film. Preferably, the organic films are made of poly-para-xylylene, and the metallic film is made of Al. The metallic film contains at least one of metal selected from a group consisting of Al, Ni, Cr, Ti, Cu, Au, and Ag, and has a function of reflecting the scintillation light generated in the scintillator 16.

The first layer film 18 may compose of a transparent inorganic film. The first intermediate layer film 20 may compose of a metallic film, and the second layer film 22 may compose of an organic film. The transparent inorganic film is made of silicon dioxide ($SiO_2$), silicon nitride ($SiN_x$) or silicon oxynitride (SiON), and has an adhesive function. Preferably, the organic film is made of poly-para-xylylene, and the metallic film is made of Al. The metallic film contains at least one of metal selected from a group consisting of Al, Ni, Cr, Ti, Cu, Au, and Ag, and the metallic film has a function of reflecting the scintillation light generated in the scintillator 16.

Figure 4B:
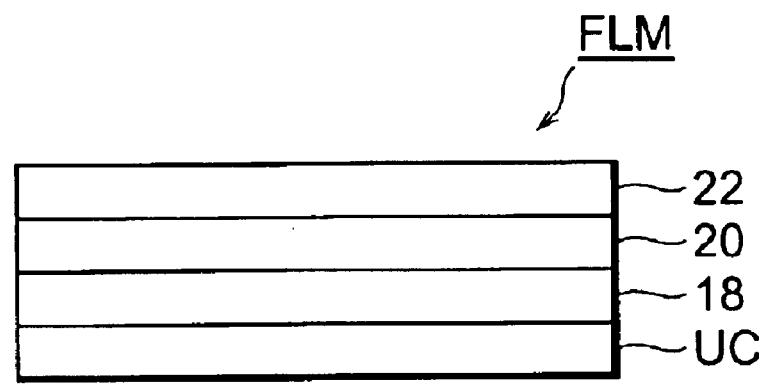

FIG. 4B illustrates a laminate structure of the coated film FLM having a four layer structure shown in FIG. 1. The difference from that shown in FIG. 4A is that the coated film FLM includes an undercoat layer film UC between the scintillator 16 (and the side tube portion 12b of glass) and the first layer film 18. In terms of adhesive strength and low reactivity, the material of the undercoat layer film UC is preferably composed of Al, but may contain at least one of metal selected from a group consisting of Ni, Cr, Ti, and Cu. Furthermore, Au or Ag can be used for the material of the undercoat layer film UC. Specifically, within the organic film, openings tend to be made depending on temperature. Gas containing water vapor penetrates through these openings into the first layer film 18 and comes finally into the scintillator 16. Therefore, when the metallic film is used as the undercoat layer film UC, and the organic film as the first layer film 18 is formed thereon, the dampproof property can be improved. In the case where the inorganic layer film is formed on the organic layer film, tensile stress acts on the inorganic layer film depending on temperature, and the inorganic layer film deteriorates. However, with this structure, the deterioration can be suppressed.

As the undercoat layer film UC, the above described transparent inorganic film can be applied. This transparent inorganic film comprises of silicon dioxide ($SiO_2$), silicon nitride ($SiN_x$), or silicon oxynitride (SiON), and has the adhesive function. Also in this case, since the undercoat layer film UC likewise functions to improve the dampproof property, the suppression of the deterioration of the inorganic layer film is possible when the inorganic layer film is prepared on the organic layer film.

Figure 4C:
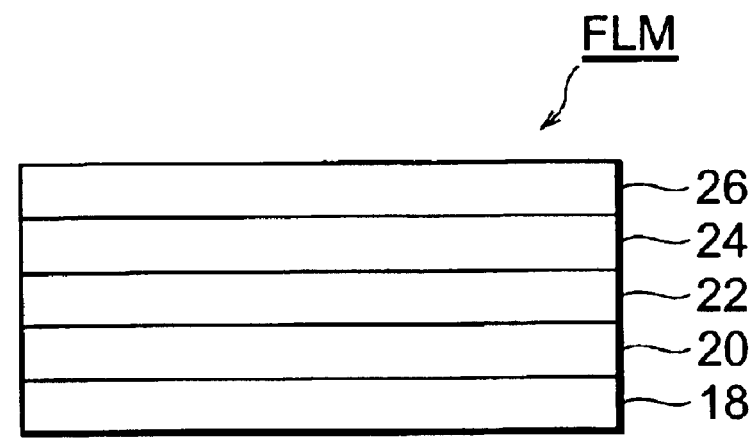
Figure 5:
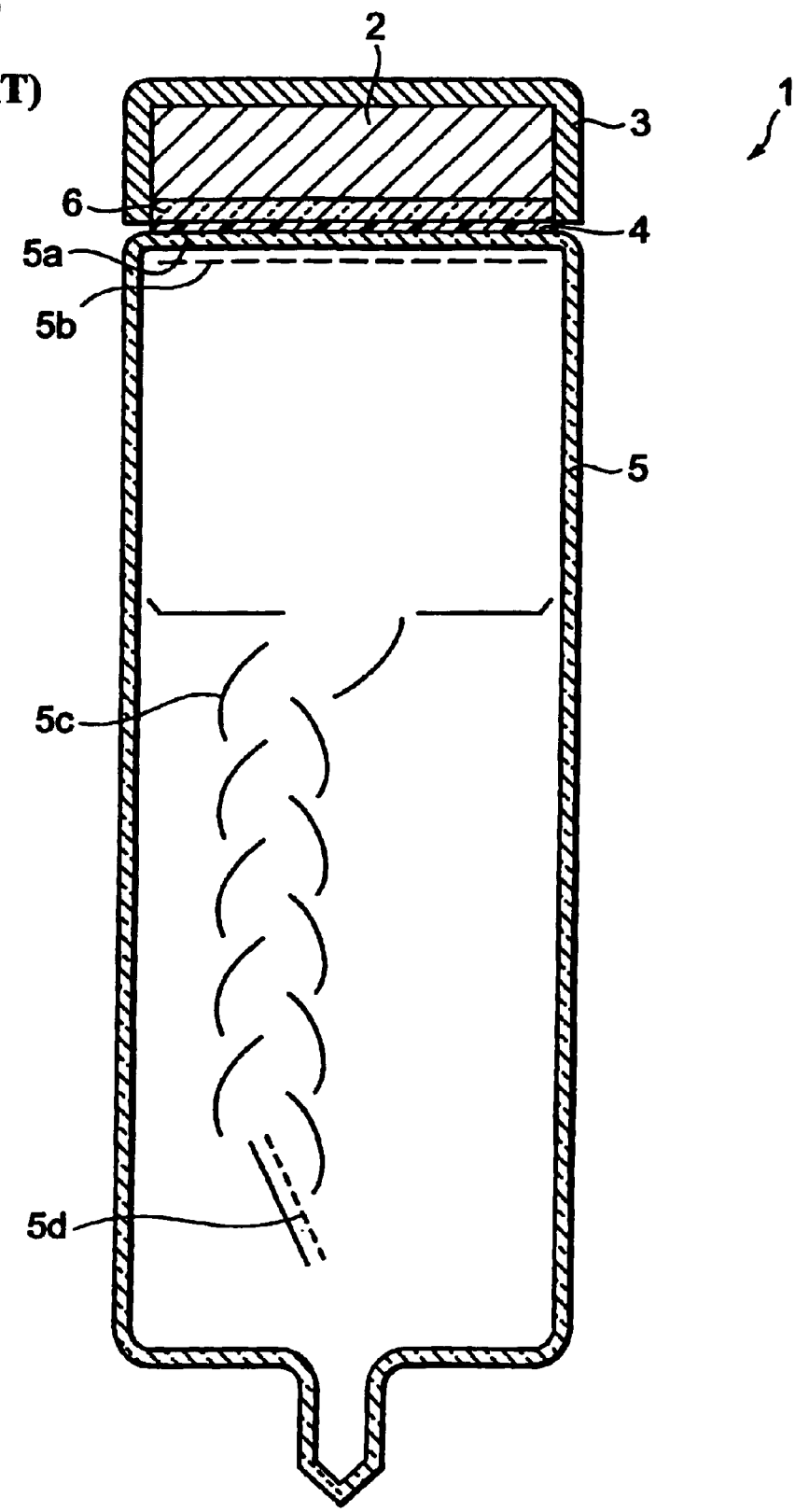
FIG. 5 is a sectional view of a radiation detector according to the conventional art.

FIG. 4C illustrates a laminate structure of the coated film FLM in FIG. 1, which has a five layer structure. The difference from that shown in FIG. 4A is that the second intermediate layer film 24 and the third layer film 26 are provided on the second layer film 22.

In the second embodiment, the second intermediate layer film 24 is a transparent inorganic film, and the third layer film 26 is an organic film. The transparent inorganic film comprises silicon dioxide ($SiO_2$), silicon nitride ($SiN_x$), or silicon oxynitride (SiON), and the organic film is made of poly-para-xylylene, thus provides strong adhesion.

The second intermediate layer film 24 may be a metallic film. Preferably, the metallic film is made of Al. The metallic film contains at least one of metal selected from a group consisting of Al, Ni, Cr, Ti, Cu, Au, and Ag, and the metallic film has a function of reflecting the scintillation light generated in the scintillator 16. Also in this case, the above described undercoat layer film UC can be provided. Note that the above described intermediate layer film may be composed of a plurality of layers.

As described above, the radiation detector 10 is a radiation detector having the scintillator 16 placed on the light incidence plane plate member of the photomultiplier tube by use of the optical binder 14 interposed therebetween, and the radiation detector 10 includes the coated film FLM formed so as to cover the scintillator and at least part of the side tube portion 12b of the photomultiplier tube. The side tube portion 12b continuously contacts with the periphery of the light incidence plane plate member 12a to constitute part of the vacuum container. According to the radiation detector 10, the scintillator and the photomultiplier tube are strongly fixed to each other by the coated film FLM, so that the size increase of the radiation detector can be suppressed.

Industrial Applicability

The present invention is applicable for the radiation detector.

What is claimed is:

1. A radiation detector comprising:
    a photomultiplier tube having said light incidence plane plate member;
    a scintillator placed on a light incidence plane plate member of said photomultiplier tube;

an optical binder having a function of adhesion of said light incidence plane plate member with said scintillator, being interposed between said light incidence plane plate member and said scintillator; and a coated film formed to cover the scintillator and at least part of a side tube portion of the photomultiplier tube, wherein an outermost layer of said coated film is an organic film formed through vapor deposition, wherein an innermost layer of said coated film is an organic film formed through vapor deposition, and wherein said outermost layer of said coated film is exposed.

2. The radiation detector according to claim 1, wherein said optical binder includes silicone.

3. The radiation detector according to claim 1, wherein said coated film includes a first layer film, a first intermediate layer film, and a second layer film, which are sequentially formed on a base material.

4. The radiation detector according to claim 3, wherein the first layer film is composed of an organic film, the first intermediate layer film is composed of a metallic film, and the second layer film is composed of an organic film.

5. The radiation detector according to claim 4, wherein both of the organic films are made of poly-para-xylylene, and the metallic film contains at least one of metal selected from a group consisting of Al, Ni, Cr, Ti, Cu, Au, and Ag.

6. The radiation detector according to claim 3, wherein the first layer film is composed of a transparent inorganic film, the first intermediate layer film is composed of a metallic film, and the second layer film is composed of an organic film.

7. The radiation detector according to claim 6, wherein the transparent inorganic film is made of any one of silicon dioxide, silicon nitride, and silicon oxynitride; the metallic film contains at least one of metal selected from a group consisting of Al, Ni, Cr, Ti, Cu, Au, and Ag; and the organic film is made of poly-para-xylylene.

8. The radiation detector according to any one of claims 3 and 6,
wherein the coated film includes an undercoat layer film interposed between the base material and the first layer film.

9. The radiation detector according to claim 8,
wherein the undercoat layer film is a metallic film.

10. The radiation detector according to claim 9,
wherein the metallic film is made of Al.

11. The radiation detector according to claim 9,
wherein the metallic film contains at least one of metal selected from a group consisting of Ni, Cr, Ti, and Cu.

* * * * *